US006537503B1

(12) United States Patent
Conway

(10) Patent No.: US 6,537,503 B1
(45) Date of Patent: Mar. 25, 2003

(54) DEVICE AND METHOD FOR SEPARATING COMPONENTS OF A FLUID SAMPLE

(75) Inventor: Hugh T. Conway, Verona, NJ (US)

(73) Assignee: Becton Dickinson and Company, Franklin Lakes, NJ (US)

( * ) Notice: Subject to any disclaimer, the term of this patent is extended or adjusted under 35 U.S.C. 154(b) by 171 days.

(21) Appl. No.: 09/671,525

(22) Filed: Sep. 27, 2000

Related U.S. Application Data

(60) Provisional application No. 60/168,896, filed on Dec. 3, 1999.

(51) Int. Cl.[7] .................................................. G01N 9/30

(52) U.S. Cl. ......................... 422/101; 210/789; 422/72; 422/102

(58) Field of Search ................................. 422/101, 102, 422/72; 436/63, 177, 45; 210/512.1, 512.3, 787, 789

(56) References Cited

U.S. PATENT DOCUMENTS

| | | | | |
|---|---|---|---|---|
| 3,849,072 A | | 11/1974 | Ayres | |
| 4,083,788 A | | 4/1978 | Ferrara | |
| 4,088,582 A | | 5/1978 | Murty et al. | |
| 4,131,549 A | | 12/1978 | Ferrara | |
| 4,154,690 A | | 5/1979 | Ballies | |
| 4,246,123 A | | 1/1981 | Cornell et al. | 210/782 |
| 4,257,886 A | | 3/1981 | Kessler | |
| 4,364,832 A | | 12/1982 | Ballies | |
| 4,417,981 A | | 11/1983 | Nugent | |
| 4,443,345 A | | 4/1984 | Wells | |
| 4,569,764 A | * | 2/1986 | Satchell | |
| 4,818,386 A | | 4/1989 | Burns | |
| 4,853,137 A | | 8/1989 | Ersson | |
| 4,877,520 A | | 10/1989 | Burns | |
| 4,946,601 A | | 8/1990 | Fiehler | 210/782 |
| 5,019,243 A | | 5/1991 | McEwen et al. | 210/94 |
| 5,269,927 A | | 12/1993 | Feihler | |
| 5,455,009 A | | 10/1995 | Vogler et al. | |
| 5,575,778 A | | 11/1996 | Hardt et al. | |
| 5,632,905 A | | 5/1997 | Haynes | |
| 5,663,285 A | | 9/1997 | Rounds | 528/320 |
| 6,063,297 A | | 5/2000 | Antanavich et al. | |

FOREIGN PATENT DOCUMENTS

| | | |
|---|---|---|
| EP | 0 017 127 | 3/1980 |
| EP | 0 627 261 A2 | 6/1994 |
| EP | 0 638 804 A1 | 8/1994 |
| JP | 6-222055 | 8/1994 |

* cited by examiner

*Primary Examiner*—Jan Ludlow
(74) *Attorney, Agent, or Firm*—Nanette S. Thomas, Esq.

(57) ABSTRACT

A device and method is provided for separating heavier and lighter fractions of a fluid sample. The device includes a collection tube, a flowable liquid separation medium and a deformable container. A separation medium is contained within the deformable container and the deformable container is positioned within the collection tube and is deformably reconfigurable under centrifugation from a first condition permitting liquid collection within the tube to a second condition establishing physical separation between the separated liquid phases.

15 Claims, 9 Drawing Sheets

DEVICE AND METHOD FOR SEPARATING COMPONENTS OF A FLUID SAMPLE

This application claims benefit of provisional application 60/168,896 filed Dec. 3, 1999.

BACKGROUND OF THE INVENTION

1. Field of the Invention

This invention relates to a device and method for separating heavier and lighter fractions of a fluid sample. More particularly, this invention relates to a device and method for collecting and transporting fluid samples whereby the device and fluid sample are subjected to centrifugation in order to cause separation of the heavier fraction from the lighter fraction of the fluid sample.

2. Description of Related Art

Diagnostic tests may require separation of a patient's whole blood sample into components, such as serum or plasma, the lighter phase component, and blood cells, the heavier phase component. Samples of whole blood are typically collected by venipuncture through a cannula or needle attached to a syringe or an evacuated collection tube. Separation of the blood into serum and blood cells is then accomplished by rotation of the syringe or tube in a centrifuge. Such arrangements use a barrier for moving into an area adjacent the two phases of the sample being separated in order to maintain the components separated for subsequent examination of the individual components.

A variety of devices have been used in collection and separation devices to divide the heavier and lighter phases of a fluid sample.

The most widely used device includes thixotropic gel material such as polyester or silicone gels. The present gel serum separation tubes require special manufacturing equipment to prepare the gel and to fill the tubes. Moreover, the shelf-life of the product is limited in that over time unbound resin may be released from the gel mass. This resin may have a specific gravity that is less than or equal to the separated serum and may float in the serum and may clog the measuring instruments such as the instrument probes used during the clinical examination of the sample collected in the tube. Such clogging can lead to considerable downtime for the instrument to remove the clog.

In addition, no commercially available gel is completely chemically inert to all analytes. If certain drugs are present in a blood sample when it is taken, there can be a chemical reaction at the gel interface.

Therefore, a need exists for a separator device that (i) is easily used to separate a blood sample; (ii) is independent of temperature during storage and shipping; (iii) is stable with radiation sterilization; (iv) employs the benefits of a thixotropic gel barrier yet avoids the many disadvantages of placing a gel in contact with the separated blood components; (v) minimizes cross contamination of the heavier and lighter phases of the sample; (vi) minimizes entrapment of the lower and higher density materials within the separator device; (vii) is able to move into position to form a barrier in less time than conventional methods and devices; (viii) is able to provide a clearer serum or plasma specimen with less cell contamination than conventional methods and devices; and (ix) can be used with standard sampling equipment.

SUMMARY OF THE INVENTION

The present invention is a method and assembly for separating a fluid sample into a higher specific gravity phase and a lower specific gravity phase. Desirably, the assembly of the present invention comprises a plurality of constituents. Preferably, the assembly comprises a container, such as a tube, a deformable container, such as a bag, and a flowable separation medium.

Most preferably, the deformable container is provided for positioning within a tube and includes a flowable fluid separation medium capable of maintaining separation of the separated fluid phases. The deformable container is deformably repositionable under centrifugation from a first condition permitting a fluid sample within the tube to a second condition establishing a physical separation between the separated fluid phases.

Preferably, the deformable container includes a flexible bag which is reconfigurable under centrifugation from a first condition to a second condition. The flowable fluid separation medium preferably includes a thixotropic fluid such as a gel having a specific gravity, which under centrifugation, becomes resident between the separated fluid sample phases. The flexible bag may be adheringly secured to the inner wall of the tube so as to provide for the deformable movement of the bag and the gel contained therein from a position adjacent the lower end of the tube to an intermediate position within the tube under centrifugation so as to establish residence of the gel in the bag between the separated fluid phases of the fluid sample. The flexible bag is preferably sealed with the gel completely contained therein.

The assembly of the present invention is advantageous over existing separation products that use gel. One advantage is that the assembly of the present invention will not interfere with analytes as compared to gels that may interfere with analytes. In particular, the assembly will not interfere with therapeutic drug monitoring analytes.

Another notable advantage of the present invention is that fluid specimens are not subjected to low density residuals such as unbound resins that are at times available in products that use gel.

Additionally, the assembly of the present invention does not require any additional steps or treatment by a medical practitioner whereby a blood or fluid sample is drawn in the conventional way, using standard sampling equipment.

DETAILED DESCRIPTION

The present invention may be embodied in other specific forms and is not limited to any specific embodiments described in detail, which are merely exemplary. Various other modifications will be apparent to and readily made by those skilled in the art without departing from the scope and spirit of the invention. The scope of the invention will be measured by the appended claims and their equivalents.

Figure 1:
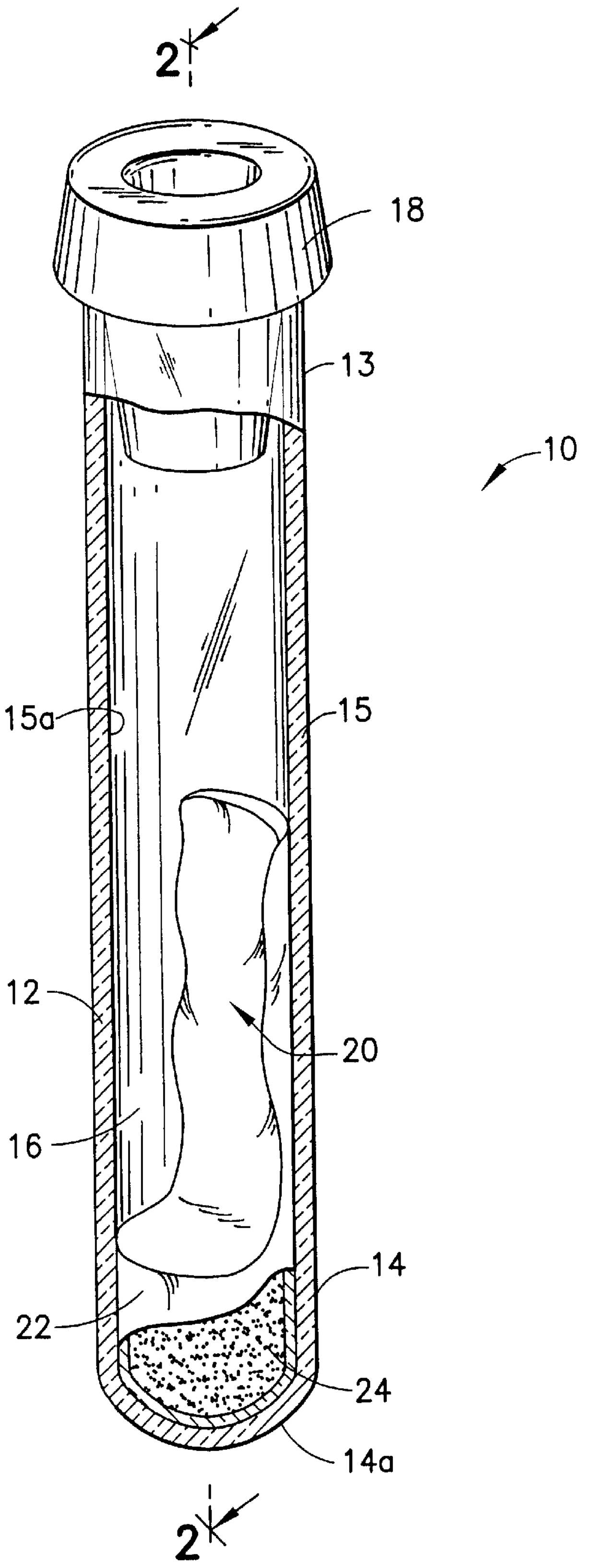
FIG. 1 is a perspective view of the assembly of the present invention including a gel-containing flexible bag supported within a tube.
Figure 2:
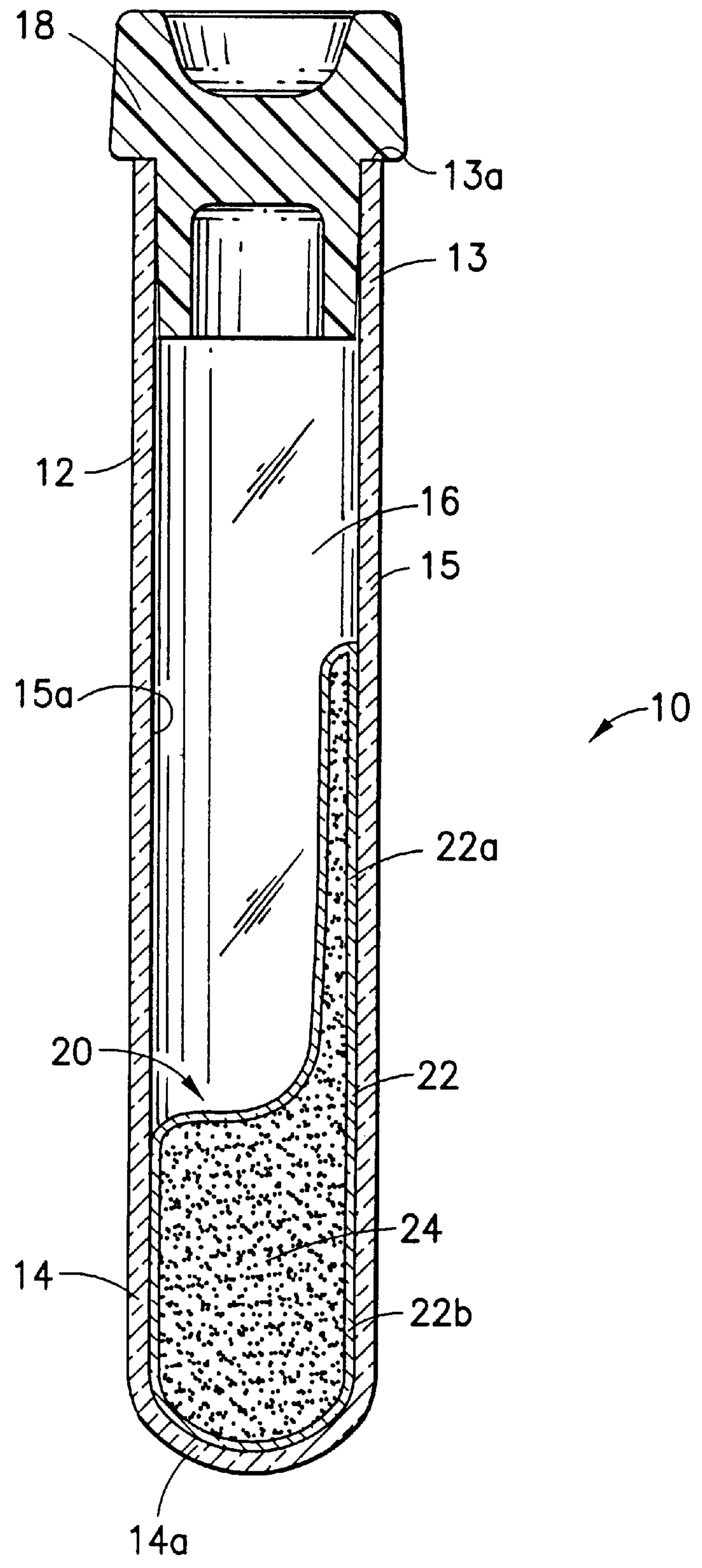
FIG. 2 is a longitudinal sectional view of the device of FIG. 1 taken along line 2—2 thereof.

Referring to FIGS. 1 and 2, assembly 10 of the present invention is shown. Assembly 10 includes a collection tube 12 having an upper end 13, a lower end 14 and a cylindrical wall 15 extending therebetween. The upper end 13 includes an opening 13*a,* while lower end 14 is closed by an integrally formed bottom 14*a.* A tube interior 16 is defined between upper and lower ends 13 and 14. Opening 13*a* of upper end 13 of tube 12 may be closed by a stopper 18 which is made of a suitable elastomer material. Alternatively, both ends of the tube may be open and both ends of the tube may be sealed by elastomeric closures. At least one of the closures of the tube may include a resealable septum.

Supported within tube 12 is a fluid phase partition device 20. Fluid phase partition device 20 includes a deformable container or flexible bag 22 and a thixotropic separation medium or a Gel 24 contained within bag 22.

Bag 22 may be a flexible deformable bag which is subject to being reconfigured upon an application of force. Bag 22 may be formed from a wide variety of both elastic and inelastic materials such as polyethylene, polyurethane or syran and which does not adversely interact with the fluid sample which would come in contact with the bag. The size of the bag is selected such that if the bag were to be completely or partially expanded it would have a dimension which would exceed the diameter of tube 12. Bag 22 is thus expandable into a configuration where it may be placed in frictional engagement with the inner surface 15*a* of cylindrical wall 15 of tube 12. Bag 22 while being deformably flexible and pliable has sufficient strength so as to permit bag deformation without risk of rupturing of the bag. Bag 22 may be formed with conventional forming techniques such as film extrusion or blow molding.

As shown in FIGS. 1 and 2, bag 22 contains a gel 24 in sealed containment therein. Gel 24 is selected so that it becomes resident between the separated phases of a fluid sample. Most preferably, gel 24 is selected to have a specific gravity intermediate the specific gravities of the lighter serum or plasma phase and the heavier cellular phase of a blood sample.

When subjected to forces such as centrifugal forces, gel 24 becomes flowable. Upon cessation of such centrifugal forces, gel 24 may return to its non-flowable state.

Gel 24 of the present invention may be a single component gel or may formed of various combinations of gels and fluids. Gel 24 may include silicones or oils or mixtures thereof such as mixtures of silicon and hydrophobic silicon dioxide powders or a mixture of liquid polybutane polymer and silicon dioxide powder. While these specific examples are provided, gel 24 can be of any material which is movable under centrifugal force to form a barrier between the separated blood phases of a blood sample. In an alternative embodiment, a highly viscous material, rather than a gel, may be used.

As shown in FIGS. 1 and 2, gel 24 fills only a portion 22*b* of bag 22 with the remaining portion 22*a* of the bag being collapsed and substantially absent of gel.

Bag 22 is inserted into tube 12 and positioned in lower end 14 of tube 12. Bag 22 may be secured adjacent bottom 14*a* of tube 12 by using a suitable adhesive. Adhesive may be applied between bag 22 and inner surface 15*a* of cylindrical side wall 15 of tube 12 adjacent bottom 14*a*. It is contemplated that bag 22 may also be secured to inner surface 15*a* at one or more locations along the length of tube 12. While an applied adhesive may be used to secure bag 22 to inner surface 15*a* of tube 12, it is contemplated that the bag itself may be formed of materials which have sufficient tackiness to promote adherence of bag 22 to inner surface 15*a* of tube 12. In an alternative embodiment, the flexible bag is not attached within the tube but is free to move with the gel.

Figure 3:
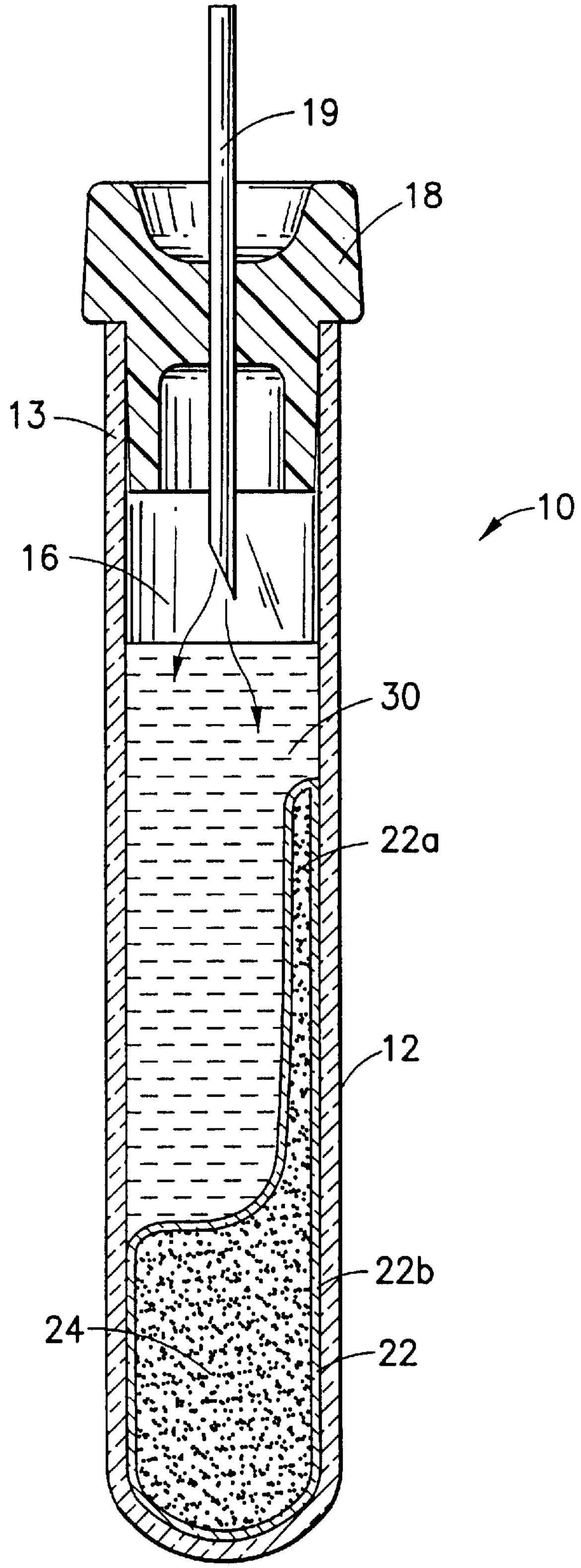
FIG. 3 is a longitudinal sectional view of the assembly of FIG. 1 taken along line 2—2 thereof illustrating fluid delivery into the assembly by a needle.
Figure 4:
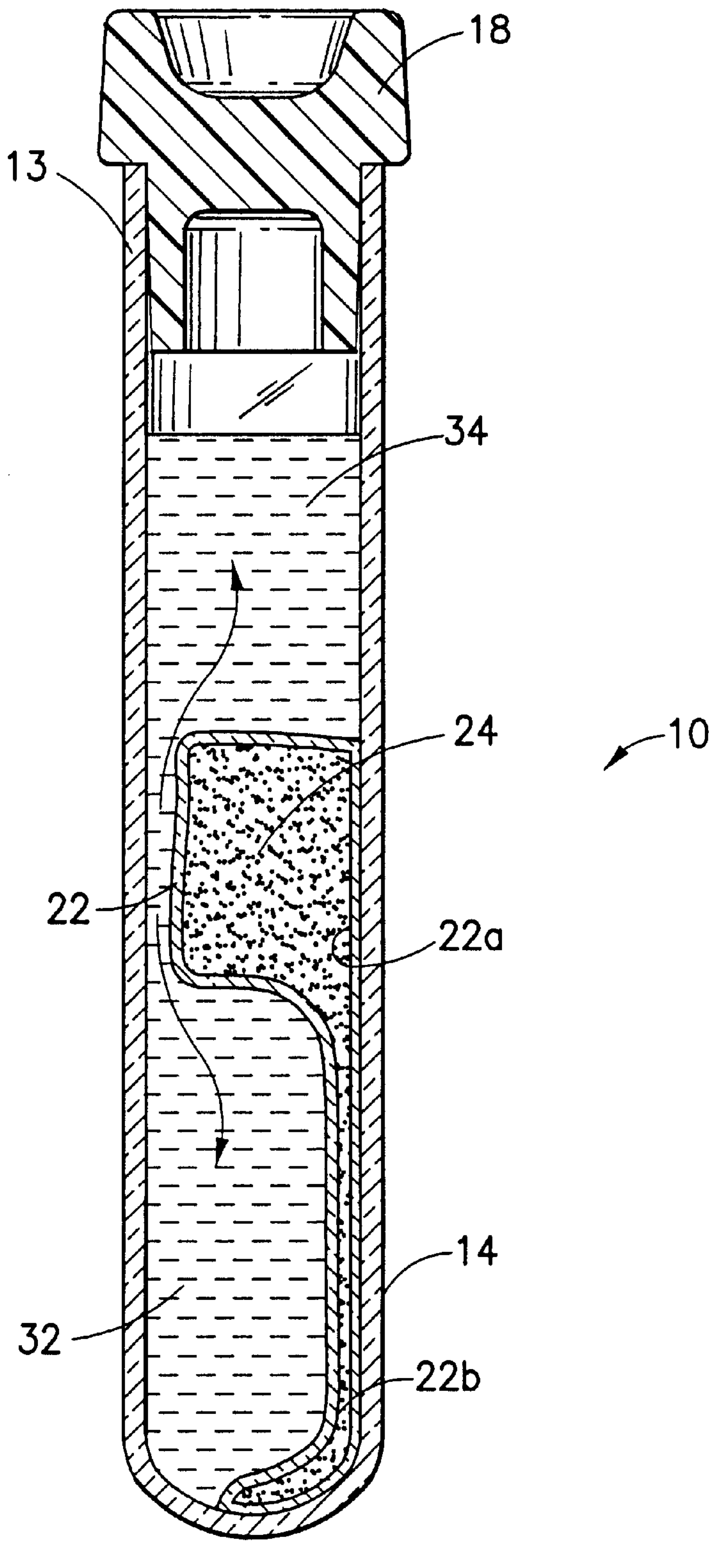
FIG. 4 illustrates the assembly under centrifugation and the movement of the separating means.
Figure 5:
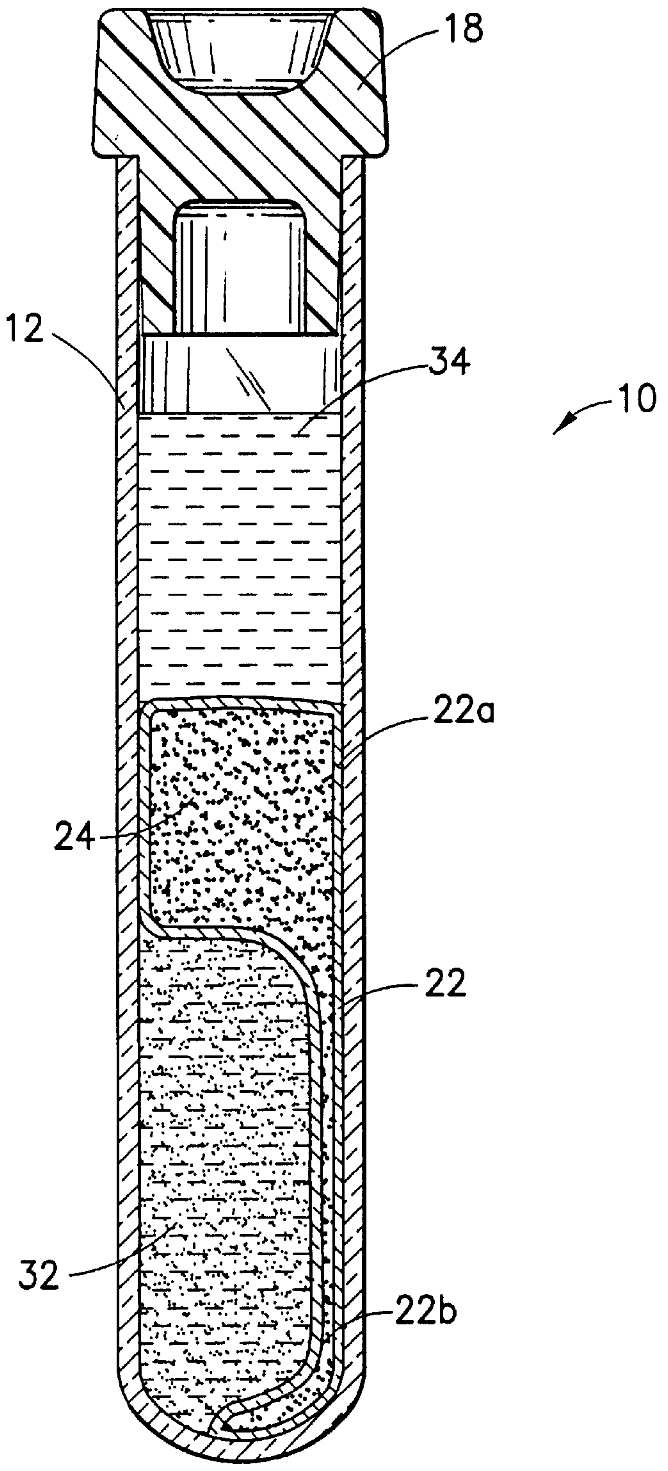
FIG. 5 illustrates the assembly after centrifugation and the separation of the fluid sample into higher and lower specific gravities.

As shown in FIGS. 3–5, liquid sample 30 is delivered into interior 16 of a collection tube 12 by a needle 19 that pierces through elastomeric stopper 18 and then the needle is removed and the stopper reseals. For purposes of illustration only, the liquid sample is blood. Liquid sample 30 substantially fills interior 16 of tube 12 between bag 22 and upper end 13 of tube 12. Tube 12 is then placed in a centrifuge device such that closed lower end 14 will be positioned radially outward of stopper 18 and the axis of rotation of the centrifuge during centrifugation. During centrifugation blood cells and other components of the heavy or higher density cellular phase 32 move toward closed lower end 14 of tube 12. The lighter or lower density phase components such as plasma or serum move toward open end 13. As shown in FIG. 4, gel 24 moves within bag 22 from a position adjacent the closed lower end 14 of tube 12 towards upper end 13 to reside at a position intermediate opposed upper and lower ends 13 and 14. Serum or plasma is squeezed upwardly and cells are squeezed downwardly at the interface. Bag 22 forms a physical separation between the separated phases.

As shown in FIG. 5, after centrifugation, lower portion 22*b* of bag 22 collapses while upper portion 22*a* of bag 22 that is filled with gel 24 provides separation between the lighter phase blood components 34 such as plasma or serum and the heavier phase cellular blood components 32.

Figure 6:
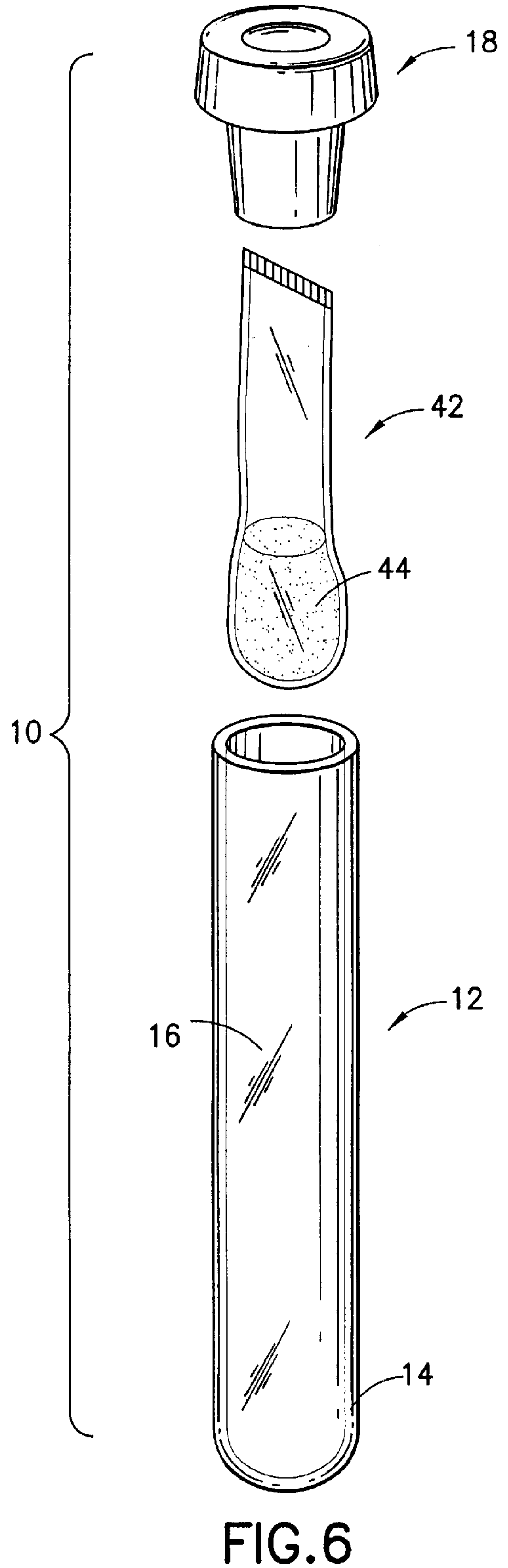
FIG. 6 is a perspective view of the unassembled elements of an alternative embodiment of the assembly of the present invention.

As shown in FIG. 6, an alternative embodiment of the present invention is illustrated. Bag 42 is substantially similar to bag 22 described above with a portion of its maximum volume filled with Gel 44 of the type described above. However, in the alternative embodiment bag 42 is inserted into interior 16 of tube 12 and is not adhesively retained in the lower end. Thus, upon centrifugation, the bag deformably reconfigures to move from a position adjacent lower end 14 of tube 12 to a more intermediate position along the tube to thereby provide the physical barrier between the centrifuged blood phases. The gel-filled bag is deformably and partially collapsed so as to permit blood phase separation during centrifugation.

Figure 7:
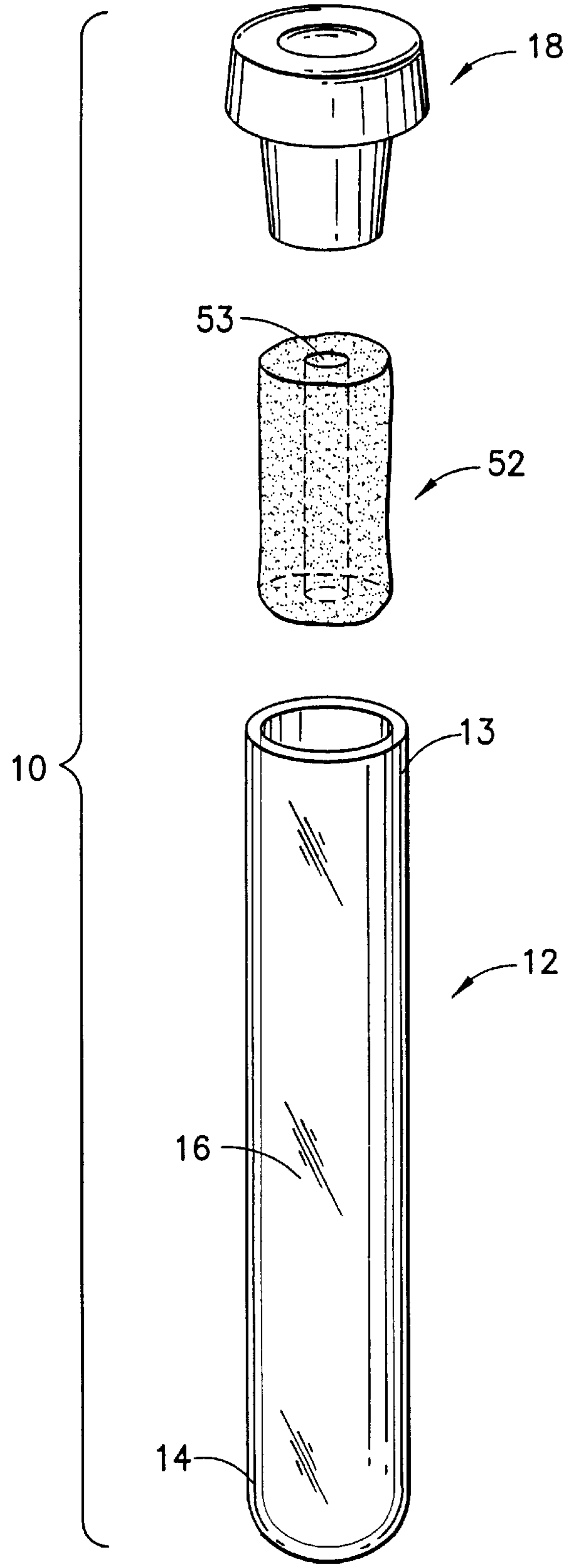
FIG. 7 is an exploded perspective view of a further embodiment of the present invention.

As shown in FIG. 7, an alternative embodiment of the present invention is illustrated. The alternate embodiment is a flexible bag 52 having a central passageway 53 therethrough. Bag 52 is filled with a gel and has a passageway 53 for passage of blood therethrough. Bag 52 is placed within interior 16 of tube 12 and may be located at a final intermediate location within tube 12 between upper end 13 and lower end 14 and may be adheringly supported to the side wall. Blood is delivered through central passageway 53 and into tube 12. Upon centrifugation, the blood components may flow through passageway 53 and be separated into the heavier and lighter phases. Centrifugation causes the bag to collapse inwardly around passageway 53 closing the passageway and establishing a physical barrier between the separated blood phases.

As shown in FIGS. 8A–D, in order to maintain the relative positioning of the gel-containing bag after centrifugation between the separated blood phases, cylindrical wall 15 of tube 12 may be modified to promote bag retention.

Figure 8A:
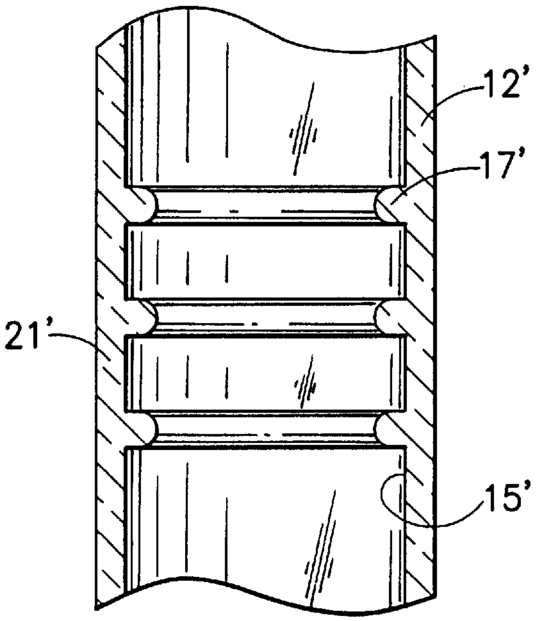
FIGS. 8A–8D show, in partial section, further embodiments of a tube used in accordance with the assembly of the present invention.

As shown in FIG. 8A, the tube 12' may include cylindrical wall 15' having a plurality of annular inwardly directed projections or ribs 17' which are spaced apart along the length of tube 12'. These ribs 17' provide a frictional surface for retentatively supporting the gel-containing bag as it moves between the blood phases during centrifugation. Ribs 17' are positioned along tube 12' at an area 21' which most closely approximates the location where blood phase separation may occur.

Figure 8B:
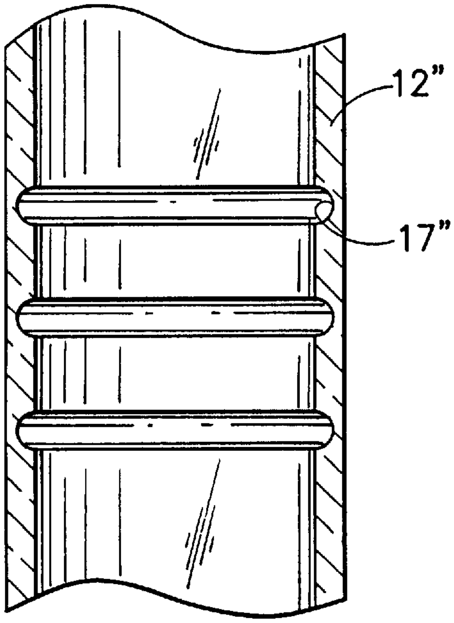

As shown in FIG. 8B, tube 12" includes a plurality of annular recesses 17" which are similar to ribs 17'. Recesses 17" support the gel containing bag during centrifugation.

Figure 8C:
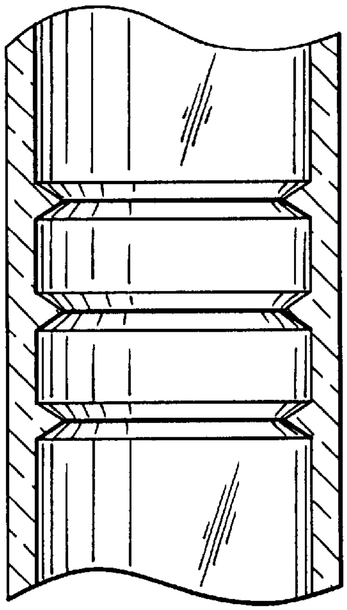
Figure 8D:
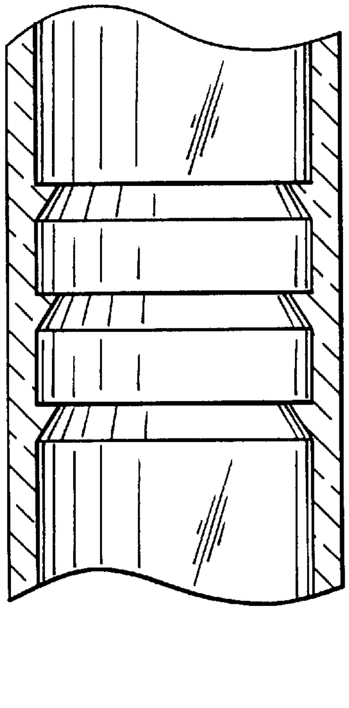

Other examples of shapes and configurations of spaced apart annular ribs are shown in FIGS. 8C and 8D. These shapes may be continuously along the circumference as shown or they may be intermittently located at areas around the circumference.

The present invention may be further modified to provide additional benefits in blood collection and testing. The present invention contemplates that the bag used to contain the gel could be coated with a clot activator to enhance clotting of a blood sample. Furthermore, these clot activators may include a surfactant such as a silicone and/or polyvinylpryolidine. The bag could also be coated with other blood interacting materials as may be desired for particular tests. These materials include heparin or protamine sulfates. Further the bag may be coated with an agglutinizing agent to promote inter-cellular adhesion for fast and efficient separation.

An alternative embodiment of the present invention includes a rigid member that is contained or attached to a flexible bag. Preferably, the rigid member is in the form of an elongated rod which is in the direction of gel flow. The rod serves to help the flexible bag erect. When inside the bag, the rod also eases gel flow by means of capillary action.

What is claimed is:

1. A collection device for maintaining separation between liquid phases separated by centrifugation or the like comprising:

an elongate collection tube for accommodating collected liquid;

a flowable liquid separation medium capable of maintaining separation of said separated liquid phases; and a flexible bag free of passageways therethrough for retaining said liquid separation medium before, during and after the centrifugation, and bag being positioned within said collection tube and being deformably repositionable under said centrifugation from a first condition permitting said liquid collection within said tube to a second condition establishing physical separation between said separated liquid phases.

2. The collection device of claim 1 wherein said tube is an elongate cylindrical member having an open end, a closed end, and a generally cylindrical wall therebetween.

3. The collection device of claim 2, wherein said wall includes an annular member formed therein for facilitating retentive engagement between said wall and said bag upon said centrifugation.

4. The collection device of claim 2, wherein said bag is captively retained within said tube.

5. The collection device of claim 4, wherein said bag is secured to said cylindrical wall of said tube and is deformable from said first condition wherein said medium within said bag is located at said closed end of the tube, to said second condition wherein said medium within said bag is located at an intermediate position between said open and closed ends.

6. The collection device of claim 4, wherein said bag is formed from a material which facilitates adhesion between said bag and said wall.

7. The collection device of claim 4, wherein said bag is secured to said wall along at least one location.

8. The collection device of claim 7, wherein said bag is secured to said wall with an adhesive.

9. The collection device of claim 1 wherein said bag defines a dimension which exceeds the diameter of said tube.

10. The collection device of claim 1, wherein said flexible bag is moveable under said centrifugation from said first condition to said condition.

11. The collection device of claim 1, wherein said bag is evacuated.

12. The collection device of claim 1, wherein said bag is formed of an elastic material.

13. The collection device of claim 1, wherein said bag is formed from materials selected from the group consisting of polyethylene, polyurethane, polyvinyl chloride, polyester, polyolefin, polyether or combinations thereof.

14. The collection device of claim 1 wherein said bag includes a clot enhancing substance for contact with said collected liquid.

15. The collection device of claim 1, wherein said flexible bag contains an elongated rod.

* * * * *